United States Patent
Malik et al.

(10) Patent No.: US 10,033,484 B2
(45) Date of Patent: Jul. 24, 2018

(54) METHOD FOR EFFICIENT PACKET FRAMING IN A COMMUNICATION NETWORK

(71) Applicant: Entropic Communications, LLC, Carlsbad, CA (US)

(72) Inventors: Rahul Malik, Bangalore (IN); Vipin Aggarwal, Irvine, CA (US)

(73) Assignee: Entropic Communications, LLC, Carlsbad, CA (US)

(*) Notice: Subject to any disclaimer, the term of this patent is extended or adjusted under 35 U.S.C. 154(b) by 108 days.

(21) Appl. No.: 15/156,389

(22) Filed: May 17, 2016

(65) Prior Publication Data
US 2016/0261443 A1 Sep. 8, 2016

Related U.S. Application Data

(63) Continuation of application No. 12/245,535, filed on Oct. 3, 2008, now abandoned.
(Continued)

(51) Int. Cl.
*H04L 1/00* (2006.01)
*H04L 5/00* (2006.01)
*H04L 27/26* (2006.01)

(52) U.S. Cl.
CPC .......... *H04L 1/0083* (2013.01); *H04L 1/0041* (2013.01); *H04L 1/0056* (2013.01);
(Continued)

(58) Field of Classification Search
CPC ... H04L 1/0041; H04L 5/0007; H04L 1/0083; H04L 1/206
See application file for complete search history.

(56) References Cited

U.S. PATENT DOCUMENTS

| 6,563,885 B1 | 5/2003 | Magee et al. |
| 6,609,225 B1 * | 8/2003 | Ng ................ H03M 13/091 714/781 |

(Continued)

FOREIGN PATENT DOCUMENTS

| WO | 2006038055 A1 | 4/2006 |
| WO | 2007064764 A1 | 6/2007 |

OTHER PUBLICATIONS

SCTE Implication Paper. "Deploying Enhanced Media Services with MoCA", 2007. http://www.mocalliance.org/ANGA/files/MoCA_Members_information/Spirent_Deploying_MoCA.pdf.

*Primary Examiner* — Steve Nguyen
(74) *Attorney, Agent, or Firm* — McAndrews, Held & Malloy, Ltd.

(57) ABSTRACT

Techniques to reduce the transmission overheads in a communication system are disclosed. In an embodiment, a method described herein relates to the elimination of redundant padding to realize an integer number of FEC codewords during the FEC-encoding process of transmission as well as the reduction/elimination of redundant padding to realize an integer number of transmission symbols during the subcarrier modulation mapping process of transmitting OFDM/ACMT/DMT symbols. The techniques are described in the context of a communication system based on the MoCA specification. Furthermore, techniques for channel-profiling, channel-estimation and bandwidth request/grant signaling that facilitate the realization of the method of reduction of transmission overheads in a MoCA system are also described.

14 Claims, 7 Drawing Sheets

Related U.S. Application Data (60) Provisional application No. 61/042,586, filed on Apr. 4, 2008.

(52) U.S. Cl.
CPC ............ *H04L 5/006* (2013.01); *H04L 5/0046* (2013.01); *H04L 27/2602* (2013.01); *H04B 2201/709709* (2013.01)

(56) References Cited

U.S. PATENT DOCUMENTS

| | | | |
|---|---|---|---|
| 6,701,478 B1 * | 3/2004 | Yang ................... | H03M 13/091 714/757 |
| 7,318,187 B2 * | 1/2008 | Vayanos ........... | H03M 13/2707 375/133 |
| 7,340,666 B1 * | 3/2008 | Wright ................ | G06F 11/1008 714/774 |
| 7,343,540 B2 | 3/2008 | Khermosh et al. | |
| 7,418,651 B2 | 8/2008 | Luby et al. | |
| 7,434,150 B1 * | 10/2008 | Barash ................ | H03M 13/091 714/807 |
| 7,584,406 B2 | 9/2009 | Niu et al. | |
| 2002/0053059 A1 * | 5/2002 | Hara ................... | H03M 13/091 714/758 |
| 2002/0174399 A1 * | 11/2002 | Keller ................ | H03M 13/091 714/781 |

* cited by examiner

METHOD FOR EFFICIENT PACKET FRAMING IN A COMMUNICATION NETWORK

CROSS-REFERENCE TO RELATED APPLICATIONS

This application is a continuation application of U.S. patent application Ser. No. 12/245,535, filed Oct. 3, 2008, and also is entitled to the benefit of provisional U.S. Patent Application Ser. No. 61/042,586, filed Apr. 4, 2008, each of which is incorporated herein by reference in its entirety.

FIELD OF THE INVENTION

The invention relates to a communication system and more particularly to a communication system using adaptive constellation multi-tone (ACMT) modulation.

BACKGROUND OF THE INVENTION

Driven by the increasing prevalence of digital content and multi-media applications, of late there has been a dramatic growth in the need for home networking. This has fuelled new development of home networking technology both wired and wireless. One such technology—Multimedia over Coax Alliance (MoCA) V1.0 Specification (identified herein as [1] or 'the standard') describes the MAC and PHY layers for high-rate communications over the coaxial TV-cable plant that is present in most homes. MoCA makes use of a 256-tone OFDM based-PHY to provide for a data-rate of up to 310 Mbps at a range of up to 300 feet on a 50 MHz channel. In order to provide for reliable communications, the standard specifies the use of a Reed Solomon (RS) forward error correction scheme drawn from Galois Field GF (256) with code-words having sizes chosen from the set {(32,40), (36,44), (64,74), (128,140), (192,208)} as specified in the standard. The respective byte-error correction capabilities for these codes are (4, 4, 5, 6, 8) respectively. Thus, the (32,40) code-word can correct 4 byte-errors in a block of 32 information-bytes using 8 parity-bytes, while the (192,208) code-word can correct for 8 byte-errors in a block of 192 information-bytes using 16 parity-bytes. Of the code-words specified in the standard, the (36,44) code is used only for beacon transmission and not for data transmission.

Figure 1:
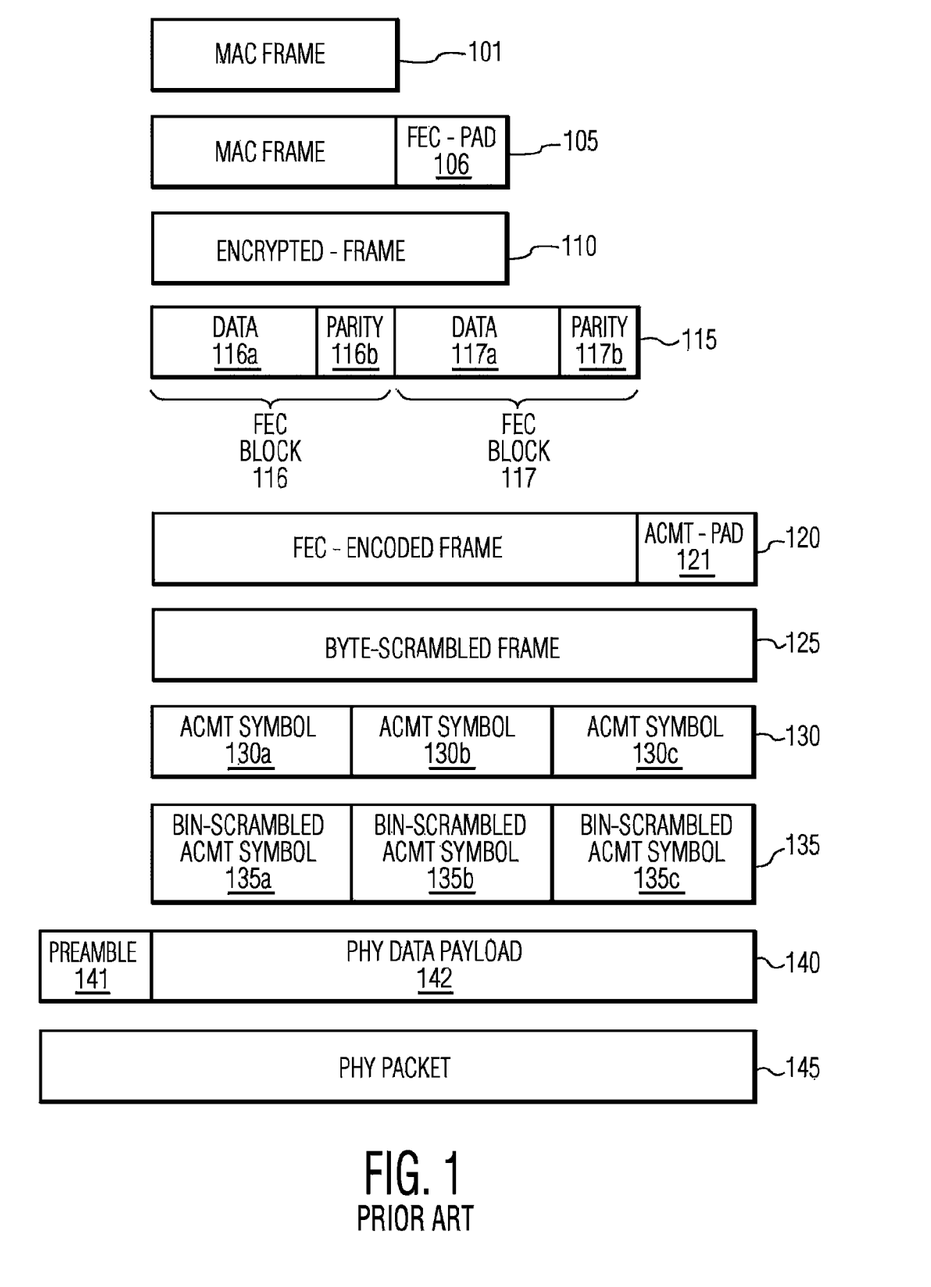
FIG. 1 depicts a convention method of framing a packet in a MoCA network.

FIG. 1 (Prior-art) depicts the steps carried out by a standard compliant transmitter in converting a MAC-packet to a PHY-packet for transmission over the channel. MAC-frame 101 depicts a packet which is handed to the PHY for transmission. The PHY performs FEC-padding by appending redundant pad information 106 to the MAC-frame 101 to produce resultant FEC-padded frame 105.

The FEC-padded frame 105 is encrypted to produce the encrypted-frame 110. The encrypted-frame 110 is FEC-encoded into individual code-blocks each code-block constituted of a data-section and a parity-section. As an example, we depict the encoding of encrypted-frame 110 into two FEC code-blocks—116 and 117, each of which is constituted of data-section—116a and 117a, and parity-section—116b and 117b, respectively. The collective FEC-encoded frame is referred to as FEC-encoded frame 115 in FIG. 1.

The FEC-pad 106 applied to MAC-frame 101, above is determined such that the eventual FEC-encoded frame can be constituted of an integer number of FEC code-words.

An ACMT-pad 121 comprising of redundant pad information is appended to FEC-encoded frame 115 to produce an ACMT-padded frame 120, as shown in FIG. 1. The ACMT-padded frame 120 is Byte scrambled to produce a Byte-scrambled frame 125, as shown in the Figure.

The Byte-scrambled frame 125 is further decomposed into an integer number (three as per this example) ACMT symbols—130a, 130b and 130c, collectively called the Subcarrier modulation mapped frame 130.

The ACMT-pad 121 applied to FEC-encoded frame 115, above is determined such that the eventual Subcarrier modulation mapped frame 130 can be constituted of an integer number of ACMT symbols.

The Subcarrier modulation mapped frame 130 is bin-scrambled to produce a bin scrambled frame 135. The PHY performs ACMT modulation on 135 and inserts the appropriate preamble 141 to generate the ACMT Modulated frame 140. Frame 140 is further filtered and up-converted to the appropriate RF-carrier frequency to generate the final PHY packet 145, which is transmitted over the channel.

A MoCA standard compliant receiver receives the transmitted PHY packet 145 and demodulates, decodes and decrypts the packet to recover the originally transmitted MAC-frame 101.

The MoCA PHY makes use of an adaptive constellation multi-tone (ACMT) modulation scheme whereby a transmitter modulates each tone of its OFDM-symbol differently in accordance with the SNR expected for that tone at the receiver, for a particular (transmitter, receiver) pair. Prerequisite to using ACMT-modulation is the profiling of the channel between all-pairs of nodes in the network. The standard defines a means whereby a new-node (NN) joining a network performs modulation profiling with all existing nodes (ENs) in the network, allowing the NN and ENs to determine the per-tone bit-loading pattern to be used for communication between them. Additionally, nodes (NN and ENs) also determine the preamble-type to be used for data communication between them.

Nodes refresh their profile information during periodic link maintenance operations (LMOs) as specified in the standard. In addition to updating their modulation profiles and preamble-types, MoCA nodes also determine the delay-spread of the channel between them and their peer-nodes and correspondingly adjust their cyclic-prefix in order to compensate for the same.

The modulation profiling of the channel between two nodes is performed by the transmitter sounding the channel with a packet comprising 256-tone ACMT symbols, referred to as a 'Type-1 Probe' in the standard. The receiver determines the per-tone SNR on each tone and determines its bit-loading capacity. It also determines the preamble-type to be used for subsequent transmissions from the transmitter. The determined per-tone bit-loading capacity and preamble-type are fed-back to the transmitter by means of a 'Type-1 Probe Report' as described in the standard. The transmitter uses this modulation profile to effect subsequent transmissions. The sum of the per-tone bit-loading capacities across all tones in the 256-tone ACMT symbol is equivalent to the number of bits per ACMT symbol defined as Nbas in the standard and henceforth referred to as Nbas256.

Likewise, the transmission of Type-3 Probes and Type-3 Probe reports as defined in the standard are used to determine the cyclic prefix to be used.

Collectively, the modulation-profile, preamble-type and cyclic-prefix to be used for a transmission/reception are referred to as a 'PHY-Profile'.

Depending on the nature of the transmission and its recipients, the standard specifies the use of different PHY-profiles between two nodes. In general, the specific bit-loading pattern, preamble-type and cyclic-prefix to be used for communication between two nodes may be identified by the 3-tuple comprising: the source node identifier, the destination node identifier and the PHY-profile identifier.

Nodes in a MoCA network exchange data with one another using a TDMA-based MAC protocol. One of the nodes in the network is designated as the network coordinator (NC)—which in addition to transacting data on the network, is responsible for coordinating medium-access among all nodes on the network, among other functions defined in [1]; while the other nodes are referred to as existing-nodes (ENs).

An EN, with data to transmit to another node first transmits a reservation-request (RR) to the NC. A RR may consist of a plurality of Request Elements, each of which reserves bandwidth for a particular transmission. The standard specifies two types of Request elements—Asynchronous Data/Control Reservation Request element and Link-Probe Reservation Request element. The Asynchronous Data/Control Reservation Request element is used for reserving bandwidth for upper-layer data and MoCA control frame transmissions, while the Link Probe Reservation Request Element is used for reserving bandwidth for probe transmissions.

As per the standard, the Asynchronous Data/Control Reservation Request Element comprises information elements as listed in the structure below:

```
Asynchronous Data/Control Reservation Request Element :=
{
    FRAME_SUBTYPE
    FRAME_TYPE
    DESTINATION
    PHY_PROFILE
    REQUEST_ID
    PARAMETERS
    PRIORITY
    DURATION
}
```

The NC computes a schedule for transmission based on the Reservation Request Elements received from nodes in its network during a scheduling interval referred to as a 'MAP-cycle' in the standard. The NC further broadcasts a 'MAP-frame' which defines the schedule for all medium activity in the subsequent MAP-cycle to all ENs in the network. Nodes in the network then transmit and/or receive data in accordance with the schedule of the MAP-frame.

A MAP-frame is comprised of a plurality of allocation-units (AUs), each of which specifies an allocation of time on the medium to a transmission as requested via a request element. The standard specifies two types of AUs—Probe Allocation Unit (PAU) and Data Allocation Unit (DAU) respectively.

A PAU is used to allocate time/bandwidth to a probe transmission.

A DAU is used to allocate bandwidth to data and control traffic on the network, providing information about the start-time, the type of transmission to be scheduled and the profile-identifier, along with the source and destination node IDs for the transmission. As per the standard, a DAU comprises of information elements as listed in the structure below:

```
Data Allocation Unit :=
{
    FRAME_SUB_TYPE
    FRAME_TYPE
    SRC
    DESTINATION
    PHY_PROFILE
    REQUEST_ID
    IFG_TYPE
    OFFSET
}
```

In accordance with the methods of the standard, the process of computing the FEC-pad 106 at the transmitter is such that the receiver needs knowledge only of the number of bits per ACMT symbol and the number of ACMT symbols in the PHY data packet payload in order to unambiguously determine the number and sizes of the RS code-words in the packet, thereby setting up the receiver for correct reception.

A MoCA receiver may determine the number of ACMT symbols to be received based on the difference in the OFFSET field between successive allocation-units in the MAP-frame, as per the method in the standard. Likewise, a receiver may determine the number of bits per ACMT symbol, the preamble-type and the length of cyclic-prefix based on the PHY_PROFILE, SRC and DESTINATION fields specified in the DAU.

As per FIG. 1, a MoCA PHY packet comprises of a preamble 141 and the PHY data payload 142. While payload 142 carries the encrypted, encoded, scrambled and modulated MAC-data, preamble 141 comprises of a known sequence. The various parts of preamble 141 are used to facilitate various aspects of packet acquisition including AGC gain settling, symbol timing estimation, frequency offset estimation etc.

The channel estimation sequence (CES) is used by the receiver to derive channel-estimates, which are subsequently used to equalize the payload ACMT symbols prior to demodulation and decoding. The MoCA preambles specified in the standard make use of a CES based on 256-tone ACMT symbols.

While MoCA [1] was originally designed to provide a usable MAC-layer throughput of 125 Mbps, it was soon determined that higher throughputs were required to support the evolving 'bandwidth-hungry' applications on home networks. MoCA V1.1 Draft Specification (referred to herein as [2]) was defined as a set of MAC-layer extensions to [1] that among other functionality, augmented the MAC-layer throughput of [1] to 180 Mbps. However, this still falls short of requirements set by newer network usage scenarios, which require even higher PHY data-rates.

SUMMARY

A method for reducing the FEC-pad overhead required to encode a data-frame to form an FEC-encoded frame, the reduction of said FEC-pad resulting in a shortened FEC encoded frame, said method comprising the step of determining a number of FEC code-words that minimizes the parity-overhead of the FEC-encoded-frame, the step of determining an FEC-pad of known values to be appended to the data-frame, said FEC-pad resulting in the shortest possible last FEC code-word in resultant FEC-encoded frame, the step of determining a shortened last FEC code-word from said last FEC code-word, said shortened last FEC code-word comprising the data of last FEC code-word without FEC-pad; and the parity of last FEC-code-word, the step of determining a shortened FEC-encoded frame, said shortened FEC-encoded frame comprising of a first group of code-words corresponding to all but the last FEC code-word of the FEC-encoded frame and a shortened last FEC code-word. Additionally, the method of the decoding said encoded frame, said method comprising the step of inserting an FEC-pad of known values in between the data and parity of the shortened last FEC-code-word of the shortened FEC-encoded frame, resulting in an FEC-encoded frame, the step of decoding said FEC-encoded-frame to determine an FEC-padded data-frame, and the step of discarding said FEC-pad to recover the under-lying data-frame. Furthermore, the method can further comprise the step of determining a number of ACMT-symbols that reduces the medium-occupancy of the associated ACMT modulated frame, and the step of determining a reduced ACMT-pad to be appended to the data-frame, the resultant ACMT-padded data-frame when modulated resulting in the number of ACMT-symbols determined above, the resultant ACMT symbols being of sizes that reduce medium occupancy, the aggregate of the ACMT modulated symbols determined above referred to as a shortened ACMT modulated frame. In addition, the method can further comprise the step of determining a reduced ACMT-pad to be appended to the data-frame the resultant ACMT-padded data-frame when modulated resulting in the number of ACMT-symbols determined above, all-but-last of the resultant ACMT symbols being of size corresponding to the largest ACMT symbol, the last ACMT symbol being of size less than or equal to the largest ACMT symbol, the aggregate of the ACMT modulated symbols determined above referred to as a shortened ACMT modulated frame.

Another embodiment is a method for generating a PHY-packet from a data-frame, prior to transmission, said method comprising the step of determining an FEC-pad of known values that results in a minimum parity overhead when encoding the data-frame above to form an FEC-padded frame, the step of FEC-encoding said FEC-padded frame to determine an FEC encoded frame, the step of determining a shortened FEC encoded frame by shortening said FEC encoded frame, the step of determining an ACMT-pad that when appended to said shortened FEC encoded frame, results in an ACMT-padded frame, the step of determining a shortened ACMT-modulated frame by modulating said ACMT-padded frame to the minimum number of ACMT-symbols, having the minimum medium occupancy, and the step of determining a PHY-packet from said ACMT-modulated frame. Furthermore the method can further comprise the step of determining an encryption-pad that when appended to the MAC-frame results in an encryption-padded frame, the step of encrypting said encryption-padded frame to determine an encrypted frame, and the step of determining an FEC-padded-frame, a FEC encoded frame, a shortened FEC encoded frame, an ACMT pad, an ACMT-padded frame, a shortened ACMT modulated frame.

Additionally, a system comprising a transmitter and a receiver is disclosed wherein the transmitter and the receiver are configured to determine the modulation profile for a reduced size ACMT symbol by the transmitter transmitting a legacy modulation profiling sequence to the receiver, and the receiver using received modulation profiling sequence to determine the signal to noise ratio of the legacy tone-positions, determining the signal to noise ratio at the tone positions of the reduced size ACMT symbol by interpolation of the signal to noise ratios of the legacy tone-positions, and communicating the determined modulation profile of the reduced-size ACMT symbol to the transmitter.

Also disclosed is a system comprising a transmitter and receiver configured to determine the modulation profile for a reduced size ACMT symbol from the modulation profile of a legacy ACMT symbol by the transmitter and receiver applying a common and pre-determined set of rules to the modulation profile of the legacy ACMT symbol to determine the modulation profile of the reduced-size ACMT symbol. Furthermore, the transmitter and receiver can apply a common set of rules where the bit-loading capacity of a tone of a reduced size ACMT symbol is determined as the minimum of the bit-loading capacities of the adjacent tones of the legacy ACMT symbol, as determined from its modulation profile.

Additionally, a transmitter can be configured to determining the parameters required by the receiver to receive a data-packet transmitted using the method for generating a PHY-packet described above. The transmitter communicates appropriate parameters prior to transmission of said data-packet, where the parameters comprises the preamble-type in use by the transmitter, the modulation-profile used by the transmitter in transmitting the packet, the cyclic-prefix in use by the transmitter for every ACMT symbol, the duration of the transmission, and the ACMT-pad used by the transmitter in its transmission. The transmitter further can be configured to transmit information to the receiver via a third-node in the network. The transmitter further can determine the parameters by selecting the preamble-type, modulation-profile and cyclic-prefix to be used based on the source, destination and type of the packet to be transmitted, determining the size of an encryption-pad to be applied to the packet so that the resultant encryption-padded packet may be encrypted to form an encrypted packet, determining the size of a FEC-pad to be applied to the encrypted-packet so that the resultant FEC-padded packet may be encoded to obtain a shortened FEC-encoded frame that has a reduced parity overhead, and determining the size of an ACMT-pad to be applied to the shortened FEC-encoded frame such that the resulting ACMT-padded frame may be modulated using the available symbol-sizes to construct a shortened ACMT modulated frame that when transmitted minimizes the medium occupancy, the resultant medium occupancy determined to be the duration.

The receiver corresponding can be configured to determine the parameters of a packet to be received based on the information received from the transmitter by determining the number of ACMT symbols to be received based on the duration of the packet, the preamble type and the cyclic-prefix, determining the size of the various ACMT symbols using the determined duration and the determined number of ACMT symbols, applying the knowledge of the methods of the transmitter in determining the ACMT modulated frame, determining the length of the shortened FEC encoded frame using knowledge of the modulation-profiles of the various symbol-sizes along with the sizes of the ACMT-symbols, and determining the size of the various FEC code-words and the FEC-pad to be inserted in the shortened FEC code word so as to recover the FEC encoded-frame.

The receiver can also be configured to determine the channel-estimates at the tone-positions of a shortened ACMT-symbol based on channel estimates at the tone positions of legacy ACMT symbols as determined from the legacy preamble by determining the size of the shortened ACMT symbol prior to receiving it and interpolating the channel estimates at the tone positions of the legacy ACMT symbol to determine the channel estimates at the tone positions of the shortened ACMT symbol.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Nodes are configured to realize a more optimal packet framing structure, resulting in a reduction (and in some instances, elimination) of redundant pad information in the MoCA PHY packet. This leads to an overall reduction in medium occupancy, the resulting savings being available for other transmissions, thereby resulting in an overall increase in throughput of the network.

Furthermore, these nodes are designed to coexist and interoperate with legacy nodes in the network. It is understood that legacy nodes are nodes in the network which have not been configured to realize a more optimal packet framing structure as described in this disclosure.

Each of the code-words specified by the standard has a different error correction capability in terms of number of byte-errors that can be corrected in a code-word. As a PHY packet can be constituted of a number of RS code-words above, the code-word with the lowest error-correction capability per unit-information is sufficiently robust to meet the transmission reliability needs of the over-lying MAC and application-layers. The number of code-blocks to be used is chosen in a manner that minimizes the overall number of code-blocks and the amount of parity-information to be associated with a payload frame, while generating an FEC encoded frame.

Using the code-words specified in the standard as exemplary in the ensuing description, the number of code-blocks Brs to be used to transmit a payload of M-bytes is determined by equation (1):

$$Brs = \lceil M/192 \rceil \quad (1)$$

A payload may thus be decomposed into a first (Brs−1) code-words of size (192,208) and a last code-word of size (Klast, Nlast) determined by equation (2):

$$(Klast, Nlast) = \begin{cases} (32, 40) & \text{if } 0 < M \bmod 192 \leq 32 \\ (64, 74) & \text{if } 32 < M \bmod 192 \leq 64 \\ (128, 140) & \text{if } 64 < M \bmod 192 \leq 128 \\ (192, 208) & \text{otherwise} \end{cases} \quad (2)$$

RS-codes belong to the class of systematic codes i.e., codes where the resultant encoded code-word comprises of the original data suffixed by the parity information. Recognizing this property, the elimination of the FEC-padding of the payload by transmitting a shortened last code-word is advocated, as described in the following.

The amount of FEC-pad i.e. MFECPad that would be required to be appended to a payload prior to FEC encoding, such that the resultant FEC-encoded packet is constituted of Brs code words as determined above, is given by equation (3), below. Consequently, the amount of information contained in the last code-word KlastAct is determined in equation (4).

$$MFECPad = 192*(Brs-1) + Klast - M \quad (3)$$

$$KlastAct = Klast - MfecPad \quad (4)$$

A transmitter pads the information to be placed in the last code-word—KlastAct-bytes, with MFECPad-bytes of known values (which are also known to the receiver). The transmitter encodes the resultant Klast-bytes to determine a code-word of Nlast-bytes.

However, in order to optimize usage of the medium, the transmitter transmits a shortened-last code word comprising of the KlastAct information bytes suffixed with the (Nlast−Klast) parity bytes determined during the encoding process. Thus the last code-word has a length of KlastAct+(Nlast−Klast) bytes.

Correspondingly, a receiver incorporating the methods embodied herein inserts a pad of MFECPad-bytes equivalent to what was used as part of encoding by the transmitter in between the KlastAct bytes of information and the (Nlast−Klast) bytes of parity. The resultant Nlast bytes code-word is decoded using conventional RS-decoding methods.

The length of the shortened FEC-encoded frame L, is thus given by equation (5).

$$L = 208*(Brs-1) + KlastAct + (Nlast - Klast) \quad (5)$$

Figure 2:
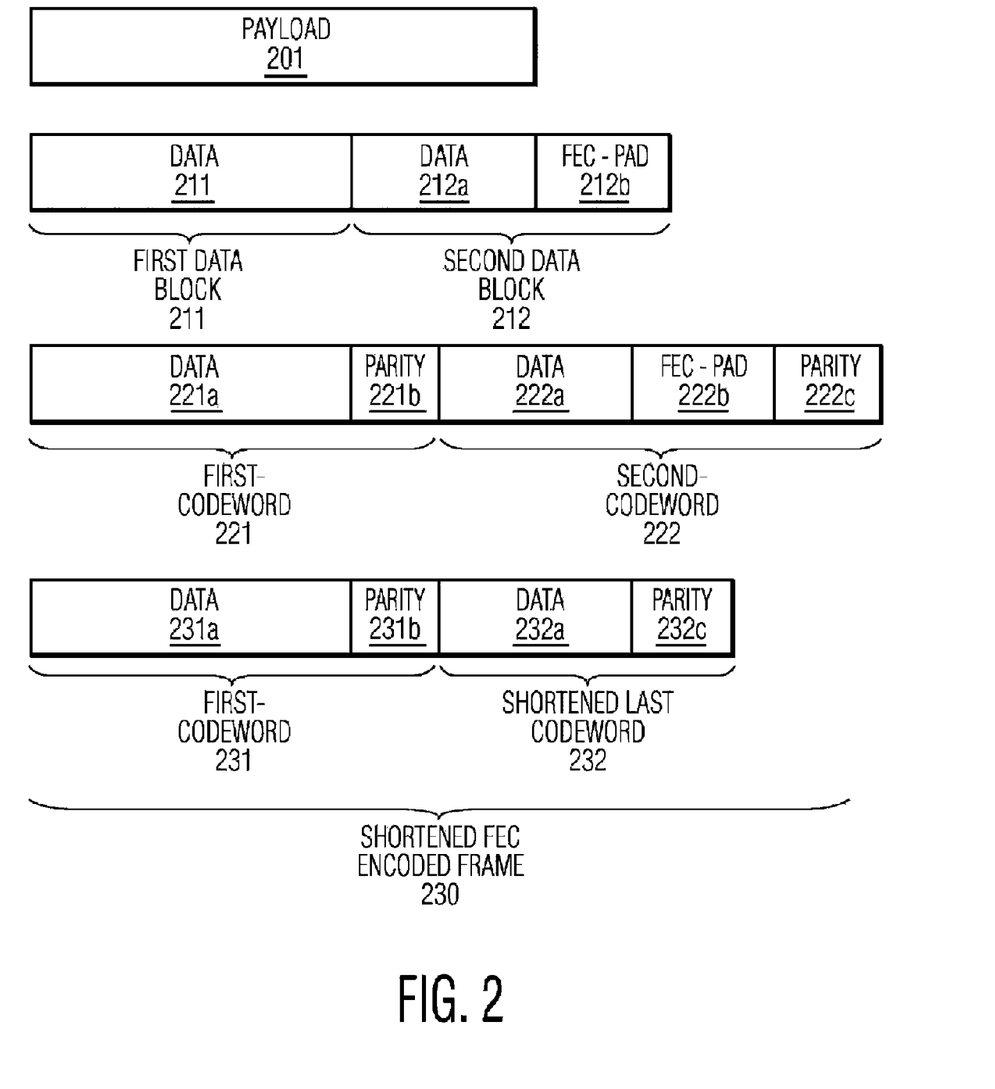
FIG. 2 depicts the method of code-shortening.

FIG. 2 depicts an example application of FEC code-shortening. Frame 201 represents a payload of M=264-bytes. The amount of FEC-padding MFECPad that aligns the payload M to an integer number of code-words Brs, while minimizing the overall parity overhead is determined using equations (1) through (3). Thus, as per the present example, Brs=2. The payload may be split into a first block 211 of size 192-Bytes and a second block 212—which comprises of 72-Bytes of data 212a and 56-bytes of FEC-pad 212b. The split payload is FEC encoded, the first codeword 221 (corresponding to block 211) being of type (192,208), while the second codeword 222 (corresponding to block 212) being of type (Klast,Nlast)=(128,140). Codeword 222 comprises of 72-Bytes of information 222a, 56-bytes of FEC-pad 222b and 12-bytes of parity 222c. The shortened FEC encoded frame 230 may then be represented by a first code word 231 (corresponding to codeword 221) and a shortened last codeword 232 comprising the information 232a (corresponding to information 222a) and the parity 232c (corresponding to parity 222c).

While described in the context of a MoCA system [1] using RS encoding, it would be apparent to one skilled in the art that similar methods would apply to alternate coding schemes e.g., LDPC; and alternate communications systems.

The use of the redundant ACMT-pad which is appended to a payload prior to subcarrier modulation mapping such that the resultant subcarrier modulation mapped frame is comprised of an integer number of 256-tone ACMT symbols, is reduced by means of adopting variable sized ACMT symbols.

A transmitter on transforming a MAC packet to a PHY-packet prior to transmission reduces/eliminates the need for ACMT-pad by using a shortened ACMT symbol having a reduced number of tones, and consequently a lower medium occupancy. The shortened ACMT symbol is selected from a set of sizes known a-priori to both transmitter and receiver. The same cyclic-prefix is used on both shortened as well as legacy 256-tone ACMT symbols.

In another aspect, a transmitter exploits the fact that larger ACMT symbols are more efficient i.e. have lower cyclic-prefix overheads than smaller ones. Such a transmitter performs subcarrier modulation mapping with the objective of using the largest available and applicable ACMT symbols first, before attempting to use shorter symbols.

As an example, we shall consider the use of shortened symbols whose length is a sub-multiple of the legacy 256-tone symbol. In the ensuing description, we shall assume a set of allowable ACMT symbols as given by {32, 64, 128, 256} tones. However, it would be apparent that the set of allowable ACMT symbols may be extended to include other symbol sizes as well.

Continuing with our illustration of a MAC-payload of M-bytes which was encoded into a shortened FEC-encoded frame of length L, as per equation (5), a transmitter determines the number of ACMT symbols Nsym to be transmitted by applying equation (6).

$$N\text{sym} = \lceil 8*L/N\text{bas}256 \rceil \quad (6)$$

Where, Nbas256 refers to the number of bits that can be accommodated in a 256-tone ACMT symbol. The value Nbas256 is determined as part of modulation profiling as described in the standard.

Additionally, nodes can be further configured to determine the number of bits per ACMT symbol for all available symbol sizes during modulation profiling. As per the present example, nodes predetermine Nbas32, Nbas64, Nbas128 and Nbas256.

Thus, in the present example, a subcarrier modulation mapped frame would comprise of a first (Nsym−1) 256-tone ACMT symbols and a last tail symbol as determined by equations (7) and (8), below.

$$\text{mod } L = (8*L) \text{mod } N\text{bas}256 \quad (7)$$

where, modL determines the number of bits to be modulated into the tail ACMT symbol.

where, Nbaslast represents the number of bits per ACMT symbol of the last/tail ACMT symbol.

The required ACMT-pad, MACMTpad to be added to the payload prior to subcarrier modulation mapping is thus determined by equation (9).

$$MACMT\text{pad} = [((N\text{sym}-1)*N\text{bas}256 + N\text{baslast})/8] - L \quad (9)$$

While it would be apparent that the most efficient subcarrier modulation mapped frame that minimizes medium occupancy may not be comprised of a plurality of the longest ACMT symbol followed by a shortened tail ACMT symbol i.e., a more efficient subcarrier modulation mapped frame could have been, for example constructed using a plurality of shorter ACMT symbols, the above-mentioned mechanism minimizes the additional signaling required in the Asynchronous data/control reservation request-element and data-allocation-unit (DAU) that are required by the MoCA MAC protocol, as described in a subsequent embodiment. However, it is understood that all such variants of reducing the overhead of the ACMT-pad by means of using variable-sized ACMT symbols are applicable as is apparent to one of ordinary skill in the art.

Figure 3:
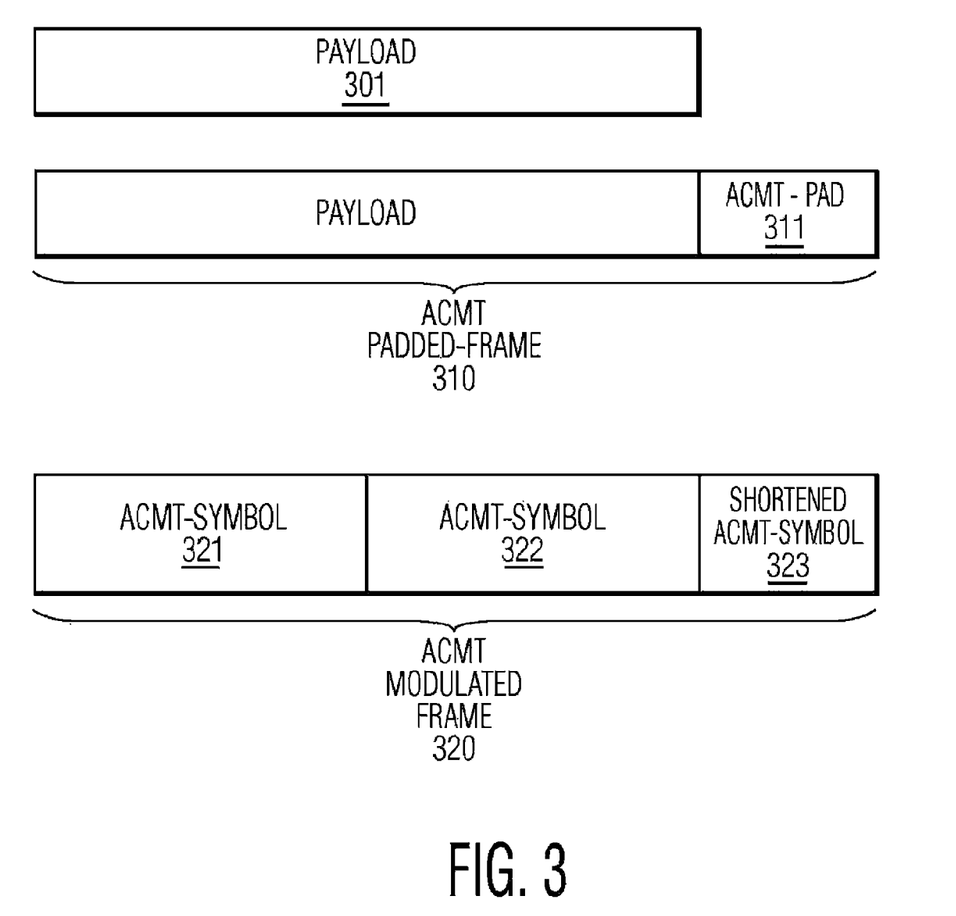
FIG. 3 depicts the method of transmitting a shortened tail-symbol.

FIG. 3 depicts an example application of tail-ACMT symbol shortening. Carrying forward with the previous example of a 264-Byte frame, the length of the shortened FEC-encoded frame L=292 was determined using (5). The number of symbols Nsym is determined as per equation (6) and the size of the last symbol and the number of ACMT-pad bytes required is determined by equations (7) through (9). As, as example, considering Nbas256=1000; Nbas128=500; Nbas64=250 and Nbas32=125 and applying the described methods, a 292-byte payload 301 would be appended with a 21-byte ACMT-pad 311 to form a padded-frame 310. The padded frame 310 is then split into an ACMT-modulated frame 320 constituted by two symbols—321 and 322 of the maximum symbol-size and a shortened tail-symbol of 128-tones 323.

Figure 4:
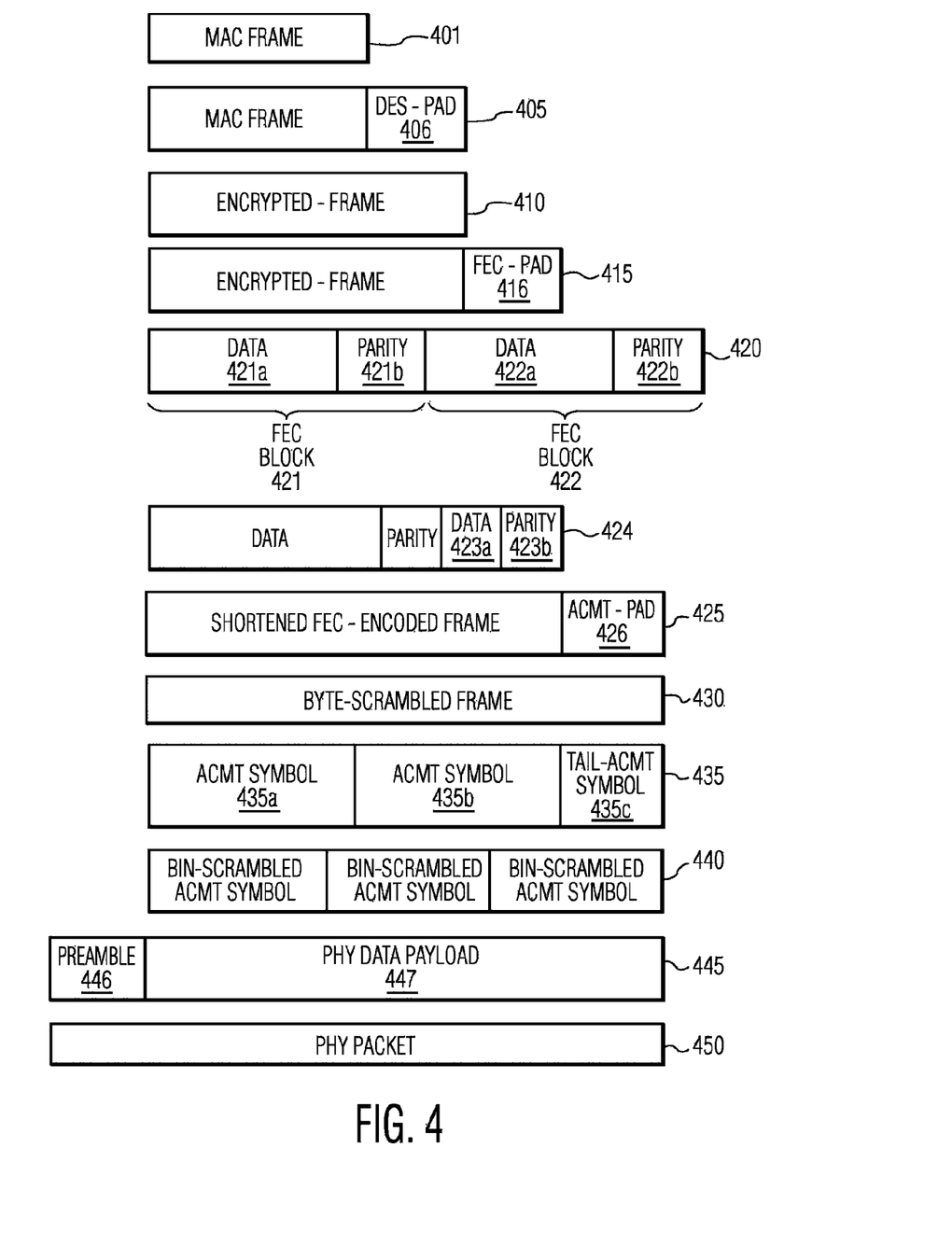
FIG. 4 depicts the method of transmitting a packet across a MoCA network.

FIG. 4 depicts the steps carried out by a transmitter in converting a MAC-packet to a PHY-packet for transmission over the channel. Packet 401 depicts a MAC-frame of m-bytes which is handed to the PHY for transmission. The PHY performs DES-padding by appending a DES-pad 406 of up to 7-bytes so as to generate a DES-padded frame 405 of length M-bytes, where M is a multiple of 8. This satisfies the requirements of the standards based DES encryption which operates on multiples of 8-bytes of data. The size of the DES-pad MDESpad is determined as per equation (10) and the DES-padded MAC frame has size M, as determined by equation (11).

$$MDES\text{pad} = 8 - (m \text{ mod } 8) \quad (10)$$

$$M = m + MDES\text{pad} \quad (11)$$

The DES-padded frame 405 is encrypted using the DES encryption scheme to produce an encrypted frame 410. It would be apparent that the requirement of DES padding to a multiple of 8-bytes is characteristic of the DES algorithm itself and is performed here in order to integrate the nodes $$N\text{baslast} = \begin{cases} N\text{bas}32 & \text{if } 0 < \text{mod}L \leq N\text{bas}32 \quad \text{// tail } ACMT \text{ symbol is 32-tone} \\ N\text{bas}64 & \text{if } 32 < \text{mod}L \leq N\text{bas}64 \quad \text{// tail } ACMT \text{ symbol is 64-tone} \\ N\text{bas}128 & \text{if } 64 < \text{mod}L \leq N\text{bas}128 \quad \text{// tail } ACMT \text{ symbol is 128-tone} \\ N\text{bas}256 & \text{otherwise} \quad \text{// tail } ACMT \text{ symbol is 256-tone} \end{cases} \quad (8)$$

into a MoCA-system. In a system that does use DES the steps of generating 405 need not be used.

The PHY performs FEC-padding by appending MFEC-pad bytes of a pre-determined FEC-pad 416 to the encrypted frame 410 to produce an FEC-padded frame 415. The FEC padded frame 415 is encoded into individual code-blocks, each code block constituted of a data-section and a parity section. As an example, we depict the encoding of 415 into two FEC code blocks 421 and 422, each of which is constituted of a data section—421a and 422a, and a parity section—421b and 422b, respectively. The FEC encoded frame is collectively referred to as 420.

FEC code block 421 would have the largest code-word size (lowest parity overhead); while FEC code block 422 may be one of the available code-words.

Additionally, FEC code block 422 may be transmitted as a shortened code-word, having a data-section 423a of size KlastAct bytes, as determined in equation (4), and a parity section 423b (equivalent to parity-section 422b of FEC code block 422) of (Nlast–Klast) bytes. Collectively, the shortened FEC encoded frame is referred to by literal 424 in FIG. 4.

An ACMT-pad 426 of length MACMTpad, as determined in equation (9) is suffixed to the shortened FEC encoded frame 424 to produce and ACMT padded frame 425. The resultant frame 425 is byte scrambled to produce the Byte-scrambled frame 430.

The byte-scrambled frame 430 is decomposed into an integer number (three as per this example) ACMT symbols—435a, 435b and 435c, collectively called the subcarrier modulation mapped frame 435.

Symbols 435a and 435b would be the longest available and applicable ACMT symbol, while symbol 435e may be any one of the available ACMT symbols. The length of symbol 435e may be determined as per equation (8).

The symbols of the subcarrier modulation mapped frame 435 are bin-scrambled to produce a bin-scrambled frame 440. The PHY performs ACMT modulation on 435 and inserts the appropriate preamble 446 to generate an ACMT modulated frame 445. Frame 445 is further filtered and up-converted to the appropriate RF-carrier frequency to generate the final PHY packet 450, which is transmitted on the channel.

Nodes embodying the methods contained herein determine the bit-loading profile and the number of bits per ACMT symbol for all supported symbol sizes using the legacy Type-1 Probes as defined in the standard. For a reduced-size ACMT symbol whose sub-carrier positions correspond to the sub-carrier positions of the Type-1 Probe's ACMT symbol, the per-tone SNRs (and consequently bit-loading) may be determined directly. For a reduced-size ACMT symbol whose sub-carrier positions do not correspond to the subcarrier positions of the Type-1 Probe's ACMT symbol, the per-tone SNRs may be estimated by means of interpolation.

According to one aspect, the per-tone bit-loading pattern as determined by the recipient of the Type-1 Probe frame may be communicated back to the transmitter by means of extending the existing Type-Probe Report, as described in the standard by altering the LENGTH field as specified in the structure below to accommodate the bit-loading patterns for the newly defined symbols—SHORTBL_PATTERNn. Thus, the Type-1 Probe Report may be redefined to contain the following fields:

```
Type-1 Probe Report :=
{
    PROBE_TYPE
    NUM_ELEMENTS
    REPORT_SOURCE
    REPORT_RECEIVER
    RELAY_FLAG
    for ( i = 0; i < NUM_ELEMENTS; i++){
        CHANNEL_SOURCE
        CHANNEL_RECEIVER
        PHY_PROFILE
        PREAMBLE_TYPE
        CHANNEL_USABLE
        MAX_BINS
        NUM_OF_SYMS
        BITS_PER_ACMT_SYMBOL
        CP_LENGTH
        GCD_BITMASK
        TPC_BACKOFF_MAJOR
        TPC_BACKOFF_MINOR
        for (j=0; j < 256; j++){
            SC_MOD
        }
        SHORT_BL_PATTERNn
    }
    PAYLOAD_CRC
}
```

A Type-1 Probe Report frame may contain a singularity or a plurality of SHORT_BL_PATTERNn fields, depending on the number of supported ACMT symbol sizes. In the instance of when a plurality of SHORT_BL_PATTERNn fields are included, the order of placement of SHORT_BL_PATTERNn fields in the Type-1 Probe Report should be predetermined in order to facilitate correct interpretation of the frame at both transmitter and receiver. As an example, we shall assume that the various SHORT_BL_PATTERNn fields are arranged in descending order of symbol size n.

A single SHORT_BL_PATTERNn field is defined as follows:

```
SHORT_BL_PATTERNn :=
{
    for j=0; j<n; j++ {
        SC_MODj
    }
}
```

Where SC_MODj refers to the bit-loading pattern applicable on tone j for a n-point ACMT symbol.

It is understood that new frame-type can be defined to carry bit-loading profiles of specific symbol sizes.

The recipient of a Type-1 Probe frame determines the bit-loading pattern for a 256-tone ACMT symbol and communicates this to the transmitter via the Type-1 Probe Report Frame, as defined in the context of legacy nodes. Nodes implemented as described here can further infer the bit-loading pattern of the available symbol-sizes by applying a common set of rules on the legacy (256-tone) bit-loading pattern. The fact that transmitter and receiver use the same rules would guarantee consistency between their respectively inferred modulation profiles for a given symbol-size.

Figure 5:
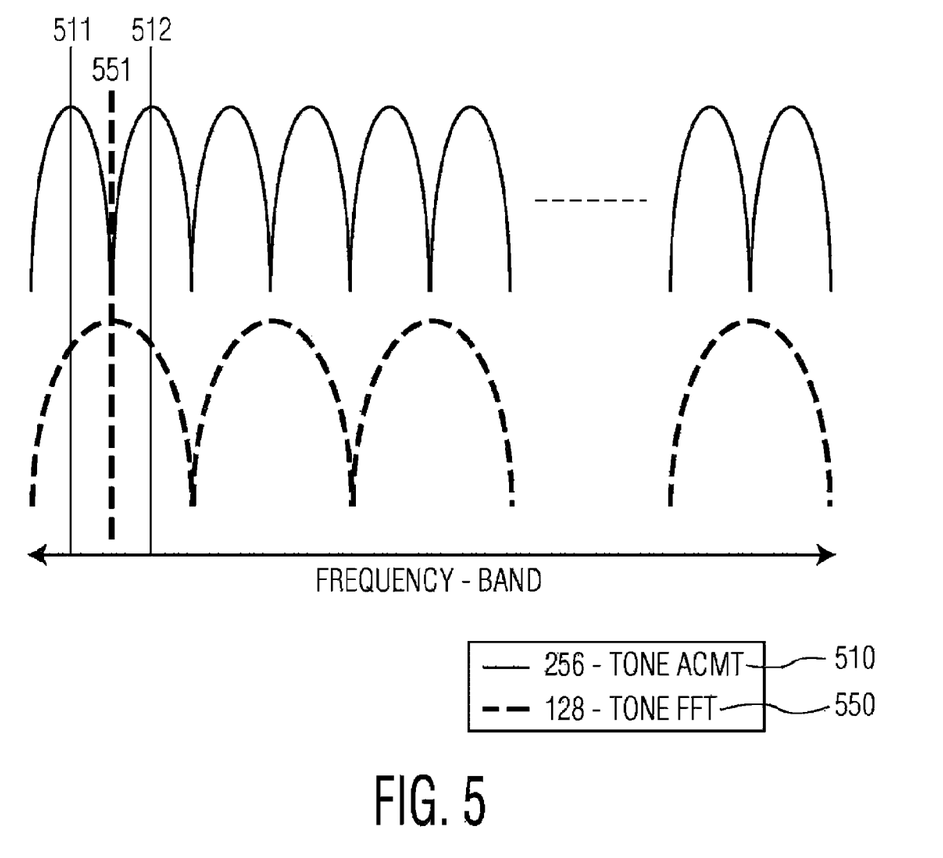
FIG. 5 depicts the method of determining the bit-loading/channel-estimates of shortened ACMT symbols.

The bit-loading of tone k of a j-tone ACMT symbol may be determined as the minimum of the bit-loading on the adjacent tones of the 256-tone ACMT symbol. As an example, the bit loading of tone 551 of a 128-tone ACMT symbol 550, may be determined as the minimum of the bit-loading of the adjacent tones—511 and 512 of the 256-tone ACMT symbol 510. As a consequence of this method, nodes implemented as described here require no additional signaling to effect the exchange of the modulation-profiles for different ACMT-symbol-sizes in a MoCA network.

It is understood that there can be several variations to the common set of rules practiced by the nodes, for example, the derived bit-loading of a particular tone may be defined to be the mean of bit-loading across several tones of the 256-tone symbol; or in another realization, having a back-off from the value determined above.

As discussed previously, the MoCA MAC protocol is built around TDMA where a node with data to transmit, first transmits a RR to the NC, which computes a schedule and broadcasts a MAP-frame defining the schedule of transmissions (in terms of AUs) over the next MAP-cycle. Nodes in the network then schedule their transmissions and reception for the next MAP-cycle based on the AUs contained in the MAP-frame.

In order to correctly demodulate a PHY packet transmitted in accordance with the method of FIG. 4, the receiver needs to be aware of the number of ACMT-symbols, their respective symbol-sizes and modulation capacity (Nbas); the cyclic-prefix; the number and size of the FEC code-blocks used; and the amount of DES-pad applied. While MoCA systems of prior-art required knowledge of only the PHY-profile in use and the number of ACMT symbols to correctly setup the receiver for reception, nodes embodying the methods contained herein, further need knowledge of the number of ACMT-pad bytes—MACMTpad.

The asynchronous-data/control request element that defines the bandwidth requirements for a data/control transmission is modified to additionally contain the MACMT_PAD field which defines the number of ACMT-pad bytes used in the transmission, as depicted in the structure below.

---

Asynchronous Data/Control Reservation Request Element :=
{
    FRAME_SUBTYPE
    FRAME_TYPE
    DESTINATION
    PHY_PROFILE
    REQUEST_ID
    PARAMETERS
    PRIORITY
    DURATION
    MACMT_PAD
}

---

The value of MACMT_PAD can be accommodated in the unused bits (eg: the reserved PARAMETERS field) of the asynchronous data/control reservation request element as defined in [1].

The DAU which is used to allocate bandwidth to a node that requested for it using a corresponding asynchronous data/control reservation request element, as defined in [1] may similarly be modified to additionally contain the MACMT_PAD field as depicted in the structure below:

---

Data Allocation Unit :=
{
    FRAME_SUB_TYPE
    FRAME_TYPE
    SRC
    DESTINATION
    PHY_PROFILE
    REQUEST_ID
    IFG_TYPE
    OFFSET
    MACMT_PAD
}

---

The MACMT_PAD field can be accommodated in the unused/reserved bits (eg: the excess bits of the SRC and DESTINATION fields) of the DAU frame as defined in [1].

Figure 6:
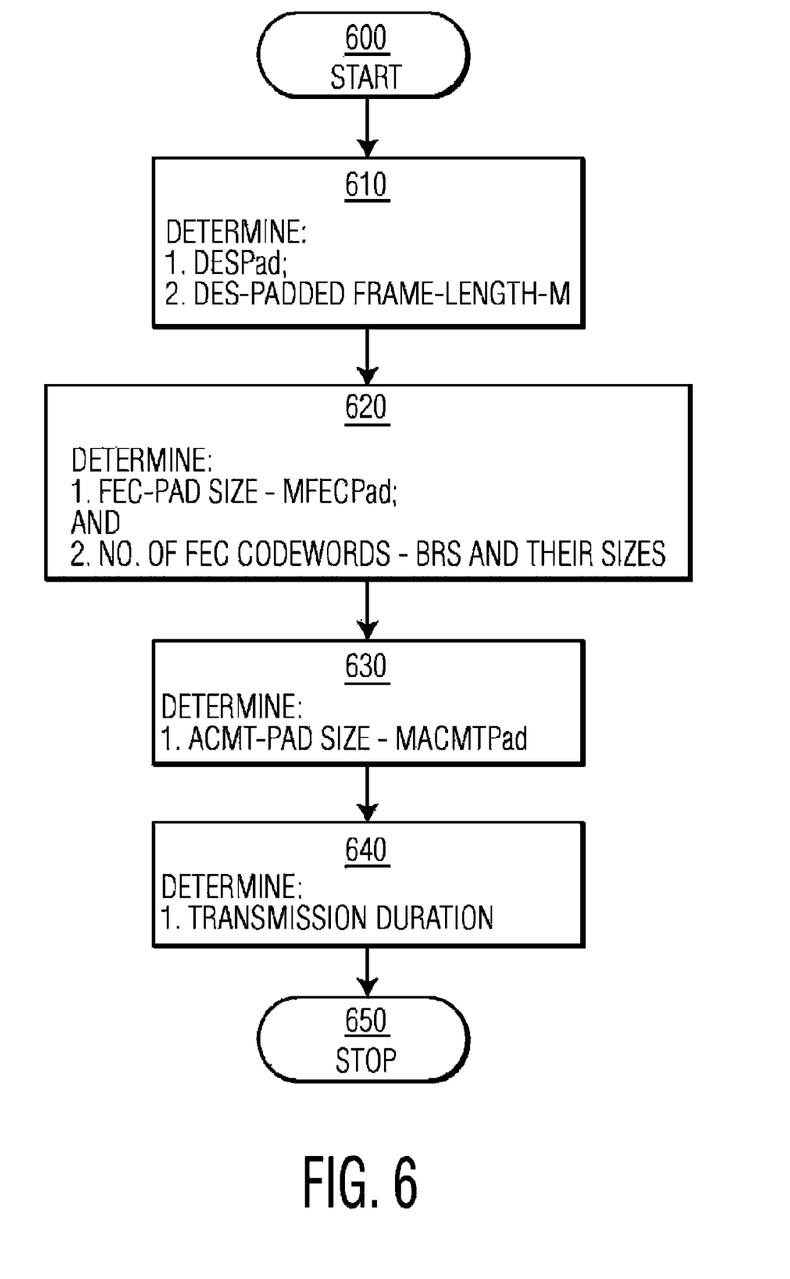
FIG. 6 is a flowchart depicting the method of a transmitter to generate a reservation request element.

FIG. 6 is a flowchart describing the method to be adopted by a transmitter to determine the DURATION and MACMT_PAD parameters of the asynchronous data/control reservation request as defined above, prior to transmission of a packet as per the steps of FIG. 4.

The flowchart is invoked in step 600, when there is a m-byte frame to be transmitted. In step 610, the size of the DES-pad and consequently the DES-padded frame is determined in using equations (10) through (11). In step 620, the size of the FEC-pad to be applied and the number and sizes of the various FEC code words is determined by means of equations (1) through (4). Further the size of the shortened FEC-encoded frame L is determined using equation (5).

In step 630, the amount of ACMT-pad to be applied in order to construct an ACMT-modulated frame is determined, applying equations (6) through (9).

In step 640, the duration of the packet transmission is determined based on the number and sizes of the ACMT-symbols as determined in step 630 and the cyclic-prefix and preamble-type in use, using the method specified in [1].

The flowchart terminates in step 650.

Figure 7:
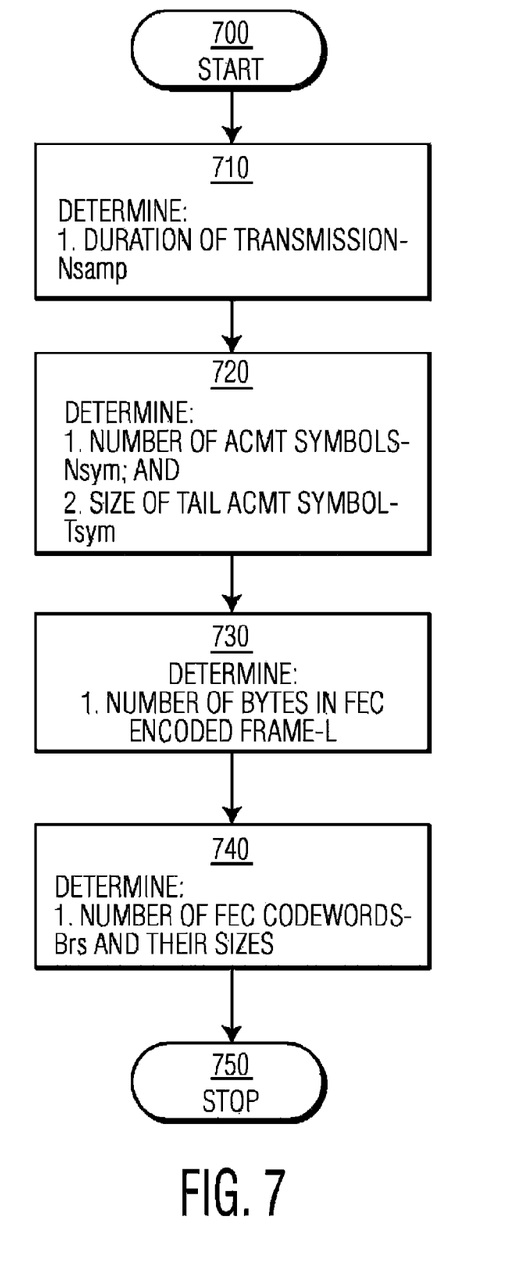
FIG. 7 is a flowchart depicting the method of a receiver to determine the receiver parameters.

FIG. 7 is a flowchart describing the method to be adopted by a receiver to determine the necessary parameters to correctly receive a PHY packet described by the DAU, as defined above.

The flowchart is invoked in step 700, on receiving a MAP-frame with a DAU indicating an impending reception to the receiver. In step 710, the duration of the transmission Nsamp is computed based on the difference in the OFFSET fields of the DAU of interest and the subsequent AU contained in the MAP-frame. Using the cyclic prefix CPlen and preamble-length PreambleLen (based on the PHY-profile indexed by the 3-tuple—(SRC, DESTINATION, PHY_PROFILE) contained in the DAU), the number of ACMT symbols Nsym and the length of the tail ACMT symbol Tsym is determined in 720, as per equations (12) and (13).

$$N\text{sym}=[(N\text{samp}-\text{PreambleLen})/(256+C\text{Plen})] \quad (12)$$

Where, PreambleLen is the length of the preamble in number of samples appropriately adjusted in accordance with the conventions of standard.

$$T\text{sym}=N\text{samp}-(N\text{sym}-1)*(256+C\text{Plen})-C\text{Plen} \quad (13)$$

Nbaslast is selected form the number of bits per ACMT symbol for the various symbol-sizes using Tsym. In step 730, the number of bytes in the shortened FEC-encoded frame L as transmitted in 424 of FIG. 4 is determined using equation (14):

$$L=\lceil((N\text{sym}-1)*N\text{bas256}+N\text{baslast})/8\rceil-MACMT\text{pad} \quad (14)$$

In step 740, the number of FEC code-words Brs and the size of the last FEC code-word FEClast of the received packet are determined as per equations (15) and (16).

$$Brs=\lceil L/208 \rceil \quad (15)$$

$$FEC\text{last}=L \bmod 208 \quad (16)$$

As per the method of the transmitter previously described in FIG. 2, the first (Brs−1) code words are of type (192,208), while the parameters of the last FEC code-word are determined as in equations (17) and (18):

$$(Klast, Nlast) = \begin{cases} (32, 40) & \text{if } 0 < FEClast \le 40 \\ (64, 74) & \text{if } 40 < FEClast \le 74 \\ (128, 140) & \text{if } 74 < FEClast \le 140 \\ (192, 208) & \text{otherwise} \end{cases} \quad (17)$$

$$KlastAct = FEClast - (Klast - Nlast) \quad (18)$$

The flowchart of FIG. 7 terminates in step 750, with the receiver having determined the number and sizes of the ACMT symbols and the number and sizes of the FEC-code-words from the DAU. The receiver can then be setup for correct reception of the packet.

A receiver can determine the size of the last ACMT symbol to be received by it, prior to actual reception, based on decoding the AUs of the MAP-frame, as described in a previous embodiment. The receiver uses this information along with the received (legacy) 256-tone channel estimation sequence to determine an appropriate set of channel estimates corresponding to the tone positions of the shortened ACMT symbol, facilitating its subsequent demodulation. The channel estimates to be applied to the shortened ACMT symbol may be based on interpolation across tones of the channel estimates of the 256-tone channel estimation sequence. Thus, as per the methods embodied herein, the transmission of additional channel estimation sequences for reduced size ACMT symbols (in addition to legacy channel estimation sequences) are not required in order to practice the method of transmitting a shortened ACMT symbol. It is understood however that additional channel estimation sequences for the reduced-size ACMT symbol can be used.

As an example, consider the tones of 256-tone ACMT symbol 510—for example tone-position 511 and tone-position 512 as representing the channel estimates at two adjacent tones, estimated from a 256-tone channel estimation sequence. The channel estimate of a corresponding tone-position 551 of a reduced size 128-tone ACMT symbol may be determined by interpolating across the channel estimates 511 and 512. It would be apparent to one skilled in the art that the channel estimates of other adjacent tones from 256-tone ACMT-symbol 510 may also be used to determine the channel estimate at tone-position 551.

The performance enhancements realizable by nodes incorporating the teachings embodied herein may be greatly enhanced by an NC not using the '2600-slot limit' between two transmissions in the network as defined in the standard.

It would be apparent to one skilled in the MoCA standard [1], that the methods incorporated herein may be practiced by a subset of nodes in a MoCA network to achieve reductions in medium occupancy during transmissions between them. As such, it would be apparent that a node incorporating the present invention may communicate with legacy nodes by reverting to means of communications specified by the standard. It would be apparent that the operation of these legacy-nodes would not be hampered by the nodes practicing the present invention. Thus, it is envisioned that nodes incorporating the present invention would be inter-operable and could coexist in a network with legacy nodes.

While certain embodiments of the invention have been described above, it will be understood that the embodiments are by way of example only. Accordingly, the invention should not be limited based on the described embodiments.

What is claimed is:

1. A method for protecting a data payload communicated between nodes over a network, the method comprising:
    encoding, in a hardware processor, a first portion of the data payload into one or more first Forward Error Correction (FEC) code-words of a first size, wherein the hardware processor is operable to execute a sequence of instructions stored in a memory; and
    encoding, in the hardware processor, a second portion of the data payload into a second FEC code-word of a second size, the second size being selected from a plurality of different sizes, the selection being based on the size of the second portion of the data payload,
    wherein the method comprises modulating each of the one or more first FEC code words using an adaptive constellation multi-tone (ACMT) symbol of a first type and modulating the last FEC code word using an ACMT symbol of a second type, the second type of ACMT symbol being selected from a plurality of different ACMT symbol types, the selection being based on the second size.

2. The method of claim 1, wherein the method comprises adding an FEC pad to the second portion of the data payload according to the second size and the size of the second portion of the data payload.

3. The method of claim 1, wherein the last FEC code-word and each of the one or more first FEC code words comprise parity-bytes.

4. The method of claim 1, wherein the plurality of different sizes comprises the first size and at least one smaller size.

5. The method of claim 1, wherein the method comprises adding an ACMT pad to the last FEC code word.

6. The method of claim 1, wherein the plurality of different ACMT symbol types comprises ACMT symbols having 32, 64, 128, and 256 tones.

7. The method of claim 1, wherein the method comprises determining a signal-to-noise ratio at a tone position of the second type of ACMT symbol by interpolating a plurality of signal-to-noise ratios of the first type of ACMT symbol.

8. A system for protecting a data payload communicated between nodes over a network, the system comprising:
    a memory storing a sequence of instructions; and
    a Forward Error Correction (FEC) encoder operable to execute the sequence of instructions to encode a first portion of the data payload into one or more first FEC code-words of a first size and operable to encode a second portion of the data payload into a second FEC code-word of a second size, the second size being selected from a plurality of different sizes, the selection being based on the size of the second portion of the data payload,
    wherein the system comprises an adaptive constellation multi-tone (ACMT) modulator operable to modulate each of the one or more first FEC code words using a symbol of a first type and operable to modulate the last FEC code word using an ACMT symbol of a second type, the second type of ACMT symbol being selected from a plurality of different ACMT symbol types, the selection being based on the second size.

9. The system of claim 8, wherein the FEC encoder is operable to add an FEC pad to the second portion of the data payload according to the second size and the size of the second portion of the data payload.

10. The system of claim 8, wherein the FEC encoder is operable to add parity-bytes to the last FEC code-word and each of the one or more first FEC code words.

11. The system of claim 8, wherein the plurality of different sizes comprises the first size and at least one smaller size.

12. The system of claim 8, wherein the ACMT modulator is operable to add an ACMT pad to the last FEC code word.

13. The system of claim 8, wherein the plurality of different ACMT symbol types comprises ACMT symbols having 32, 64, 128, and 256 tones.

14. The system of claim 8, wherein the system comprises a channel estimator operable to determine a signal-to-noise ratio at a tone position of the second type of ACMT symbol by interpolating a plurality of signal-to-noise ratios of the first type of ACMT symbol.

* * * * *